United States Patent Office 3,540,300
Patented Nov. 17, 1970

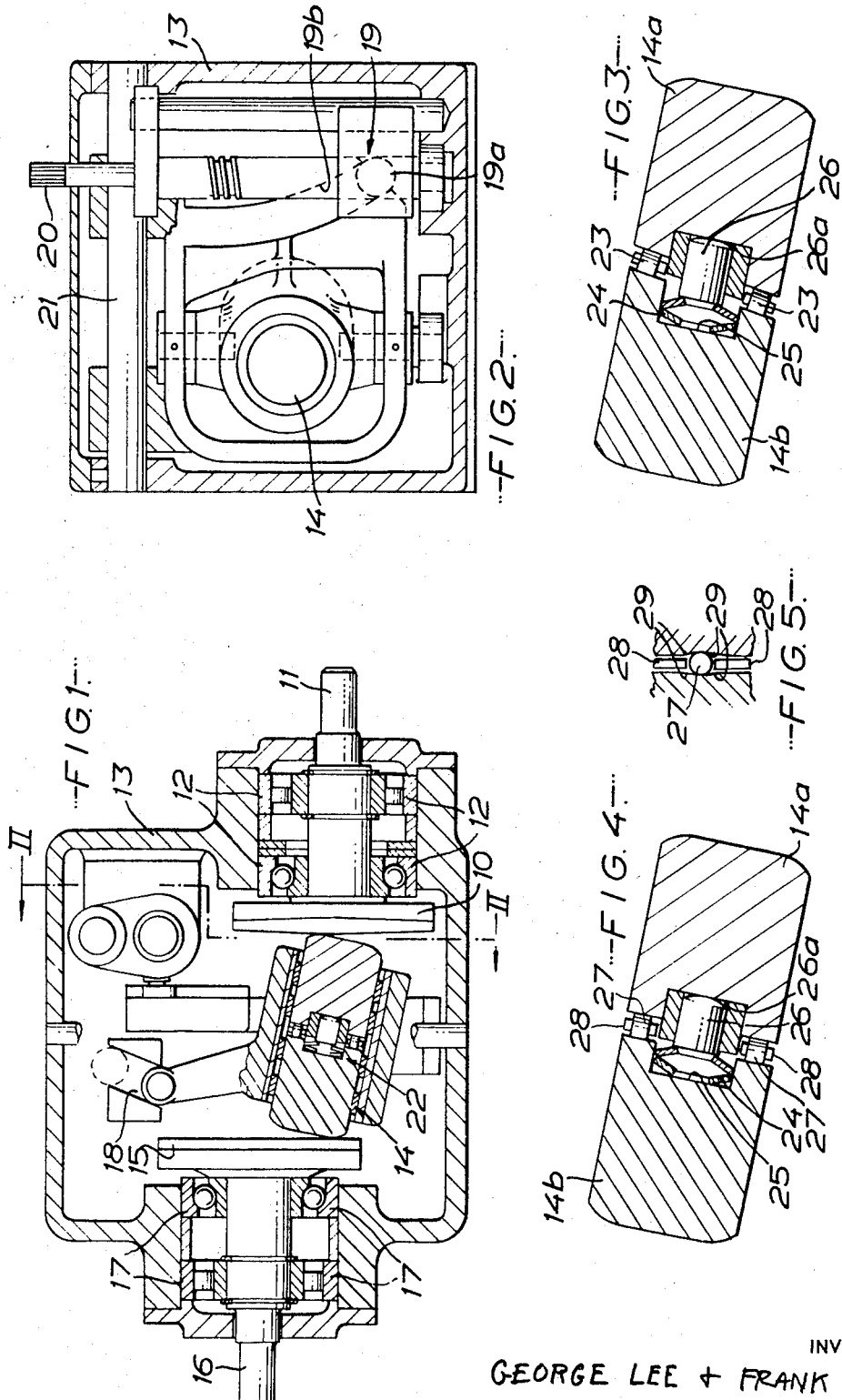

3,540,300
VARIABLE SPEED GEAR
George Lee, Ferndown, Dorset, and Frank Holt, Rochdale, England, assignors to H.L.F. Engineering Developments Ltd., a corporation of Great Britain
Filed June 21, 1968, Ser. No. 739,098
Claims priority, application Great Britain, June 22, 1967, 28,773/67
Int. Cl. F16h 15/12, 13/14
U.S. Cl. 74—200                                    5 Claims

ABSTRACT OF THE DISCLOSURE

A friction drive gear comprising a central gear member mounted between input and output gear members and arranged to be in frictional driving contact therewith, the central gear member comprising separate axially aligned portions between which is mounted resilient means and thrust means for causing said portions to remain in driving contact with the input and output gear members.

---

This invention relates to friction drive gears and concerns improvements of or modifications to the arrangement described and claimed in our United Kingdom Letters Patent No. 1084963.

In said earlier application, there was defined a friction drive gear comprising a first gear member constituted by a disc mounted for rotation on its axis perpendicular to its plane, a second gear member also rotatably mounted and having a circular peripheral part in driving contact with a face of the disc and a third gear member also constituted by a disc mounted for rotation on its axis perpendicular to its plane and also having a face in driving contact with a circular peripheral part of the second gear member, which latter is mounted for translational movement across the faces of the discs to enable the gear ratio of the gear to be altered, and for angular movement to alter the position of its axis of rotation.

The object of the present invention is to provide, by way of modification or improvement, a friction drive gear in which the second gear member is provided with thrust means, adapted in use to ensure that the first and third gear members are maintained in driving contact with said second gear member under conditions of load.

Thus according to the present invention, a friction drive gear as claimed in our United Kingdom for Letters Patent No. 1084963 is characterised in that said second gear member includes means adapted, in use and under conditions of load of the friction drive gear to maintain driving contact between said second gear member and said first and third gear members respectively.

The invention will now be described further, by way of example only, with reference to two practical forms thereof as illustrated in the accompanying drawings, in which:

FIG. 1 is a part sectional view of a friction drive gear made in accordance with the invention,
FIG. 2 is a section taken on line II—II of FIG. 1,
FIG. 3 is an elevation of an embodiment of the modification according to the invention,
FIG. 4 is an elevation of a further embodiment of said modification and
FIG. 5 is a plan view of a part of the embodiment shown in FIG. 4.

A friction drive gear, made in accordance with the invention described and defined in Pat. No. 1084963, includes a first gear member 10 constituted by a disc having an inclined face, said disc being mounted on a driving shaft 11 said shaft being journalled in bearings 12 in a gear housing 13. There is also provided a second gear member in the form of a substantially barrel-shaped member 14 which is adapted at a part of its periphery to be in frictional driving contact with said first gear member 10, and a third gear member 15 also in driving contact with the barrel-shaped member 14 and being in the form of a second disc having a flat face. The third gear member is mounted on an output shaft 16 for rotation therewith in bearings 17.

The second gear member 14 is arranged for translational movement across the faces of the discs 10 and 15 together with angular movement relative thereto, by means of a first roller guide 18 whereby the member 14 can be moved to alter the gear ratio between the first and third gear member 10 and 15, and thus between the input and output shafts 11 and 16. A second roller guide 19 (see FIG. 2) ensures a linear output speed change proportional to said translational movement of the member 14.

As the control screw 20 for the gear is turned, the second gear member 14 is moved across the faces of the discs 10 and 15 in one direction. Simultaneously it is moved in a direction normal thereto by means of the roller guide 19, the gear member 14 thus moving on a guide rail 21, whilst a guide roller 19a moves up a ramp 19b.

In accordance with the present invention, however, the second barrel-shaped gear member 14 includes thrust means, generally indicated at 22, for ensuring that frictional driving contact is maintained between the said member 14 and the discs 10 and 15 in use and under conditions of load.

Firstly as shown in FIG. 3, the thrust means includes a thrust bearing 23 mounted between separate input and output portions 14a and 14b of the member. The bearing 23 is mounted at an angle of approximately 80° to the axis of rotation of the member 14. A disc spring 24 is located within a recess 25 in the output portion 14b of the member 14 and tends, in use, together with a roller 26 having a crowned end and located within a recess 26a in the portion 14a, to push the portions 14a and 14b apart.

In use, therefore, if drive is imparted, via the first gear member 10, to the input portion 14a of the second gear member 14, and a load is applied to the third gear member 15 acting through the output portion 14b of said second gear member 14, the input and output portions 14a and 14b tend instantaneously to rotate relative to each other. However the angular arrangement of the thrust bearing 23 tends to move the portions apart axially. Thus each portion is afforded firm driving contact with its respective disc.

When no load is applied to the output shaft 16 of the gear, the action of the disc spring 24 in forcing the portions apart, is sufficient to provide driving contact between the gear members.

In an alternative embodiment, as shown in FIG. 4, the angularly disposed thrust bearing is replaced by a plurality of rollers 27 mounted in a cage 28 to form a thrust bearing. The cage 28 is disposed at right angles to the axis of rotation of the second gear member 14 and the rollers are arranged between the inclined faces 29 which can be attached to or be integral with the input and output portions 14a and 14b of the gear member 14.

The arrangement is such, therefore, that when the two portions 14a and 14b tend to rotate relative to each other, due to a load applied to the output shaft 16 of the gear, the rollers 27 tend to roll up the oppositely disposed inclined faces 29 thereby, once again, to push the two portions 14a and 14b apart and to provide frictional driving contact between the three members of the gear.

It can be seen that, the greater the load applied to the output shaft 16 of the gear, the greater is the frictional driving contact between the gear members. In addition, sudden acceleration from standing of the input or driving shaft 11 of the gear causes instantaneous positive drive to the output shaft 16 thereof.

What we claim is:

1. A friction drive gear comprising a first gear member constituted by a disc mounted for rotation on its axis perpendicular to its plane, a second gear member also rotatably mounted and having a circular peripheral part in driving contact with a face of the disc and a third gear member also constituted by a disc mounted for rotation on its axis perpendicular to its plane and also having a face in driving contact with a circular peripheral part of the second gear member, which latter is mounted for translational movement across the faces of the discs to enable the gear ratio of the gear to be altered, and for angular movement to alter the position of its axis of rotation, characterized in that said second gear member comprises separate axially aligned portions between which is mounted resilient means for normally urging the portions apart and for maintaining contact between the three gear members and also mounted between said portions thrust means for increasing the contact force upon relative rotation of said separate axially aligned portions.

2. A friction drive gear as in claim 1, in which said thrust means is disposed between and in contact with said portions and is mounted at an angle of approximately 80° to the axis of rotation of the second gear member.

3. A friction drive gear as in claim 1, in which said thrust means includes a plurality of rollers mounted in a cage, the latter being disposed at right angles to the axis of rotation of said second gear member, said rollers being arranged between oppositely disposed inclined faces on said input and output portions of said second gear member.

4. A friction drive gear as in claim 1, in which said resilient means is a disc spring disposed in a recess in one of said second gear portion, between the latter, whereby said portions tend to be urged apart.

5. A friction drive gear as in claim 4 in which said disc spring abuts a roller having a crowned end and disposed within a recess in said other gear portion, coaction between the spring and the roller causing said portions to be urged apart.

References Cited

UNITED STATES PATENTS

| 3,242,748 | 3/1966 | Prager | 74—200 |
| 3,261,219 | 7/1966 | Kraus | 74—200 |
| 3,261,220 | 7/1966 | Kraus | 74—200 |

JAMES A. WONG, Primary Examiner

U.S. Cl. X.R.

74—209